US012671234B2

(12) United States Patent
    Golikov et al.

(10) Patent No.:    US 12,671,234 B2
(45) Date of Patent:     Jun. 30, 2026

(54) METHOD AND APPARATUS FOR AUTONOMOUSLY DEPLOYING GEOPHYSICAL CABLES IN THE SAND DUNES AREAS

(71) Applicant: SAUDI ARABIAN OIL COMPANY, Dhahran (SA)

(72) Inventors: Pavel Golikov, Dhahran (SA); Grigoriy Yashin, Moscow (RU); Valerii Serpiva, Moscow (RU)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 100 days.

(21) Appl. No.: 18/707,962

(22) PCT Filed: Jun. 15, 2023

(86) PCT No.: PCT/RU2023/000186
§ 371 (c)(1),
(2) Date: May 7, 2024

(87) PCT Pub. No.: WO2024/258310
PCT Pub. Date: Dec. 19, 2024

(65) Prior Publication Data
US 2025/0385494 A1     Dec. 18, 2025

(51) Int. Cl.
*G02B 6/50*       (2006.01)
*F16L 55/26*      (2006.01)
*H02G 1/06*      (2006.01)

(52) U.S. Cl.
CPC ................ *H02G 1/06* (2013.01); *F16L 55/26* (2013.01)

(58) Field of Classification Search
CPC . F16L 1/028; G02B 6/504; H02G 9/04; E21B 7/04; E21B 7/06; E21B 7/26
See application file for complete search history.

(56) References Cited

U.S. PATENT DOCUMENTS 5,033,907 A *   7/1991   O'Donnell ............. E21B 19/20
                                                   166/341
7,520,696 B2    4/2009   Pihl
                    (Continued)

FOREIGN PATENT DOCUMENTS

CN       104727749 B    10/2016
CN       107187568 A     9/2017
                    (Continued)

OTHER PUBLICATIONS

Badger; "Concept and Approach;" Robot for Autonomous Underground Trenchless Operations, Mapping and Navigation; 2020; https://www.badger-robotics.eu/content/concept-and-approach (4 pages).
(Continued)

*Primary Examiner* — Sean D Andrish
(74) *Attorney, Agent, or Firm* — Osha Bergman Watanabe & Burton LLP

(57) ABSTRACT

A system for autonomously deploying geophysical cables in sand dunes includes a surface station positioned at the sand dunes, one or more subsurface burrowing robots including distributed acoustic sensing geophysical cables laying robot, and a geo-locating radio system (GLRS). The one or more subsurface burrowing robots digs in the sand dunes to a target depth located between a base of the sand dunes and a base of loose sand, autonomously moves under a surface of the loose sand along a predefined path, exchanges data with the surface station via an unspooling cable, and receives commands from the surface station via the unspooling cable. The GLRS transmits telemetry data from the one or more subsurface burrowing robots to the surface station. The GLRS comprises a first GLRS positioned on the base of the sand dunes and a second GLRS disposed on the one or more subsurface burrowing robots.

18 Claims, 7 Drawing Sheets

(56)         References Cited

U.S. PATENT DOCUMENTS

| | | | |
|---|---|---|---|
| 10,914,052 B1 | 2/2021 | Hemmati et al. | |
| 2012/0055674 A1 | 3/2012 | Sweatman et al. | |
| 2017/0260840 A1 | 9/2017 | Watkins et al. | |
| 2017/0292329 A1 | 10/2017 | Hayik | |
| 2019/0284890 A1 | 9/2019 | Purkis | |
| 2020/0277853 A1 | 9/2020 | Guzman | |
| 2022/0049561 A1 | 2/2022 | Saeed et al. | |

FOREIGN PATENT DOCUMENTS

| | | |
|---|---|---|
| CN | 108798651 A | 11/2018 |
| EP | 3655357 B1 | 11/2021 |

OTHER PUBLICATIONS

Baptiste Darbois Texier, et al., "Low-resistive vibratory penetration in granular media;" PLoS One; Apr. 18, 2017; https://doi.org/10.1371/journal.pone.0175412 (11 pages).

Kelly M. Dorgan, "The biomechanics of burrowing and boring;" Journal of Experimental Biology; Jan. 2015 (9 pages).
Ryan D. Maladen, et al., "Undulatory Swimming in Sand: Subsurface Locomotion of the Sandfish Lizard;" Science; Aug. 2009 (7 pages).
N. D. Naclerio, et al, "Soft Robotic Burrowing Device with Tip-Extension and Granular Fluidization," IEEE/RSJ International Conference on Intelligent Robots and Systems (IROS), 2018, pp. 5918-592 (6 pages).
Nicholas D. Naclerio, et al., "Controlling subterranean forces enables a fast, steerable, burrowing soft robot;" Science Robotics; 2021 (11 pages).
Wei, H, et al., "Review on bioinspired planetary regolith-burrowing robots; "Space Science Reviews; 2021 (40 pages).
W. Zhao, et al., "A Multigait Continuous Flexible Snake Robot for Locomotion in Complex Terrain," in IEEE/ASME Transactions on Mechatronics, vol. 27, No. 5, pp. 3751-3761, Oct. 2022 (11 pages).
International Search Report issued for corresponding international patent application No. PCT/RU2023/000186, mailed Mar. 14, 2024 (4 pages).
Written Opinion issued for corresponding international patent application No. PCT/RU2023/000186, mailed Mar. 14, 2024 (5 pages).

* cited by examiner

METHOD AND APPARATUS FOR AUTONOMOUSLY DEPLOYING GEOPHYSICAL CABLES IN THE SAND DUNES AREAS

BACKGROUND

Recently, with the development of the distributed acoustic sensing (DAS) technology, optical cables became not only data transfer channels but the seismic sensor by themselves. To obtain better ground coupling and an environmental noise reduction, the geophysical cables must be buried underground. Conventional methods for deploying geophysical cables use trenching or cable ploughing machines in shallow trenches in telecommunication and geoscience. However, the conventional methods are difficult or impossible in the areas with loose sand such as sand dunes in the remote desert regions or in coastal silt areas. There are also limited attempts to automate this process utilizing robotics. Accordingly, there is a need of automation of the deployment of geophysical cables for the geophysical data acquisition in sand dunes or coastal silt areas for data transmission or sensing underground in the remote sand dunes areas.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a system for autonomously deploying geophysical cables in sand dunes. The system comprises a surface station positioned at the sand dunes, one or more subsurface burrowing robots comprising a distributed acoustic sensing (DAS) geophysical cables laying robot, and a geo-locating radio system (GLRS). The one or more subsurface burrowing robots is configured to dig in the sand dunes to a target depth located between a base of the sand dunes and a base of loose sand, autonomously move under a surface of the loose sand along a predefined path, exchange data with the surface station via an unspooling cable, and receive commands from the surface station via the unspooling cable. The GLRS is configured to transmit telemetry data, from the one or more subsurface burrowing robots to the surface station. The GLRS comprises a first GLRS positioned on the base of the sand dunes and a second GLRS disposed on the one or more subsurface burrowing robots.

In general, in one aspect, embodiments disclosed herein relate to a method for autonomously deploying geophysical cables in sand dunes. The method comprises positioning a surface station at the sand dunes, digging in the sand dunes, using one or more subsurface burrowing robots including a distributed acoustic sensing (DAS) geophysical cables laying robot, to a target depth located between a base of the sand dunes and a base of loose sand, autonomously moving the one or more subsurface burrowing robots under a surface of the loose sand along a predefined path, exchanging data between the one or more subsurface burrowing robots and the surface station via an unspooling cable, receiving commands, by the one or more subsurface burrowing robots, from the surface station via the unspooling cable, and transmitting telemetry data, by a geo-locating radio system (GLRS) from the one or more subsurface burrowing robots to the surface station.

Other aspects and advantages of the claimed subject matter will be apparent from the following description and the appended claims.

DETAILED DESCRIPTION

Figure 1:
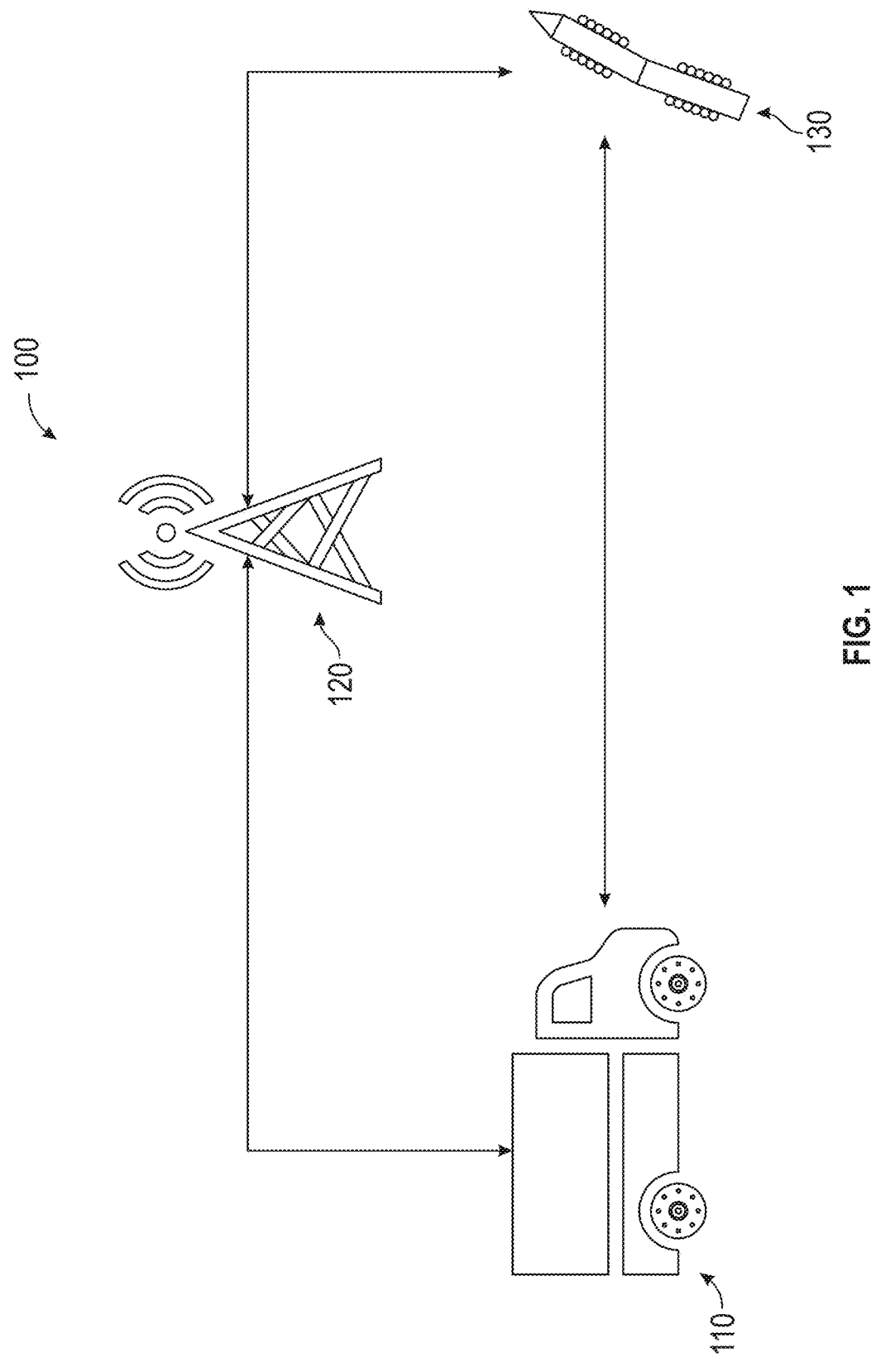
FIG. 1 shows an overview of a system for autonomously deploying geophysical cables in the sand dunes area in accordance with one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to a person having ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the disclosure provide a system and method for autonomously deploying geophysical cables for data transmission or sensing underground in the sand dunes characterized with loose sand such as in the remote desert regions or in coastal silt (shallow water) areas. Embodiments of the disclosure provide a fully autonomous system and method for geophysical cables deployment utilizing one or more subsurface burrowing robots. A detailed description is subsequently provided in reference to the figures.

FIG. 1 shows an overview of a system for autonomously deploying geophysical cables in the sand dunes area in accordance with one or more embodiments of the disclosure.

The system 100 comprises a surface station 110 positioned at the sand dunes, a geo-locating radio system (GLRS) 120, and one or more subsurface burrowing robots 130. The surface station 110, the one or more subsurface burrowing robots 130, and the GLRS 120 are subsequently described in FIG. 2, FIG. 3, and FIG. 5, respectively.

Figure 2:
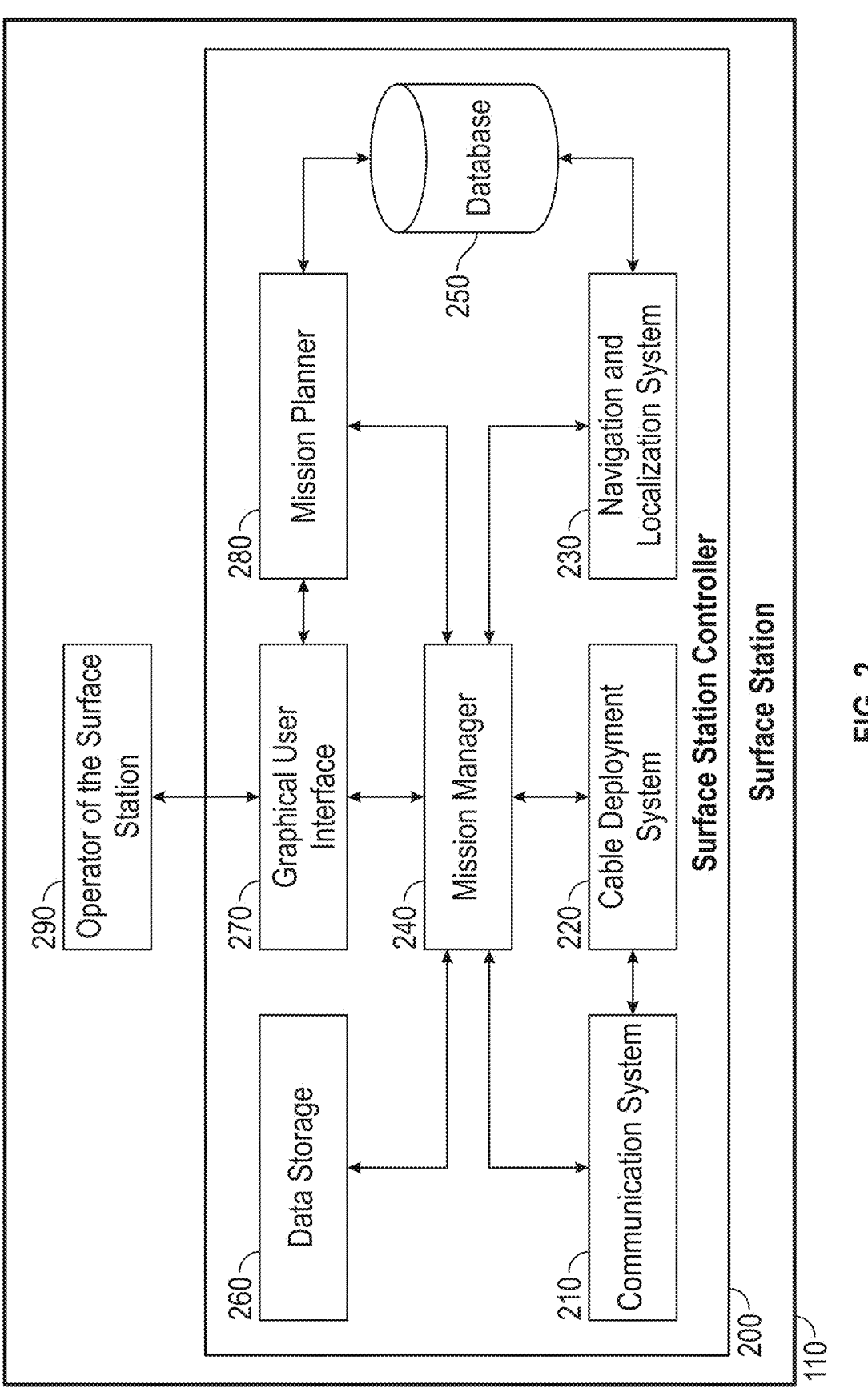
FIG. 2 shows a block diagram of a surface station controller in accordance with one or more embodiments of the disclosure.

FIG. 2 shows a block diagram of a surface station controller in accordance with one or more embodiments of the disclosure. The surface station controller 220 comprises a communication system 210, a cable deployment system 220, a navigation and localization system 230, a mission manager 240, a database 250, a data storage 260, a graphical user interface (GUI) 270, and a mission planner 280. Each of these components is subsequently described.

The communication system 210 is operatively connected to the mission manager 240 and the cable deployment system 220. The communication system 210 is configured to provide the tasks and the movement trajectory, for deploying the geophysical cables, to the one or more subsurface burrowing robots 130 based on the ground map and the terrain data of the sand dunes. For example, the communication system 210, may be a wireless communication system.

The cable deployment system 220 is operatively connected to the communication system 210 and the mission manager 240. The cable deployment system 220 is configured to deploy the geophysical cables without a risk of entanglement with the one or more subsurface burrowing robots 130 or the obstacles in the sand dunes.

The navigation and localization system 230 is operatively connected to the mission manager 240 and the database 250. The navigation and localization system 230 is configured to get the positions of the one or more subsurface burrowing robots 130 and to geo-locate radio sources.

The mission manager 240 is operatively connected to the communication system 210, the cable deployment system 220, the navigation and localization system 230, the data storage 260, the GUI 270, and the mission planner 280. The mission manager is configured to allow an operator 290 of the surface station 110 to oversee the mission for deploying the geophysical cables as it unfolds by using the ground map displayed on the GUI 270, to visualize real-time positions of the one or more subsurface burrowing robots 130, to make corrections to the movement trajectory of the one or more subsurface burrowing robots 130, and to check positions of the deployed geophysical cables.

The database 250 operatively connected to the navigation and localization system 230 and the mission planner 280. The database 250 is configured to store a ground map and the terrain data of the sand dunes.

The data storage 260 is operatively connected to the mission manager 240 and the GUI 270. The data storage 260 configured to store data of the mission for deploying the geophysical cables, the data of the deployed geophysical cables, and the telemetry data sent by the one or more subsurface burrowing robots 130.

The GUI 270 is operatively connected to the mission manager 240 and the mission planner 280. The GUI 270 is configured to receive, from the operator 290 of the surface station 110, the setting parameters of the mission for deploying the geophysical cables.

The mission planner 280 is operatively connected to mission manager 240, the database 250, and the GUI 270. The mission planner 280 prepares the tasks and the movement trajectory for deploying the geophysical cables based on the ground map and the terrain data of the sand dunes stored in the database 250.

Figure 3:
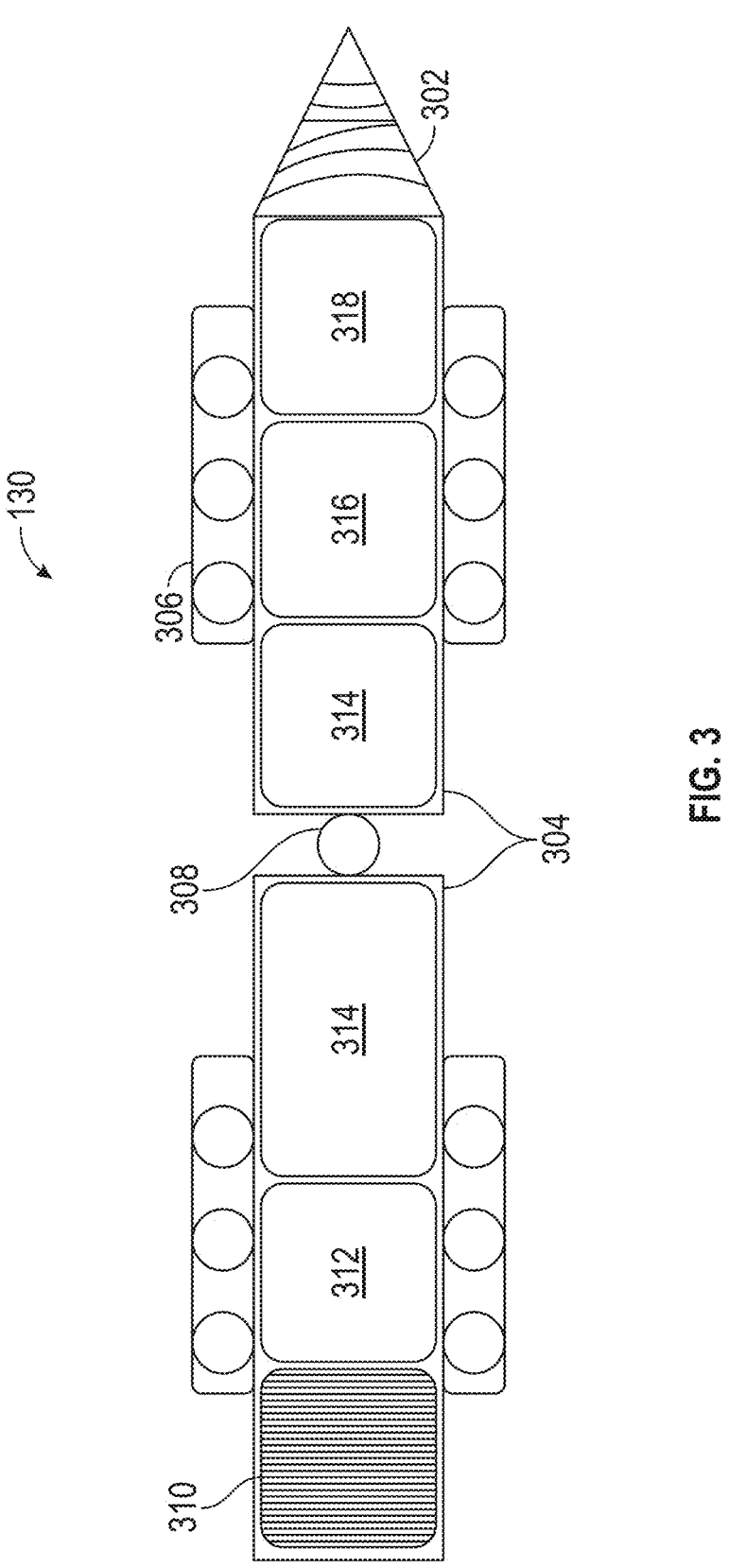
FIG. 3 shows a block diagram of a subsurface burrowing robot in accordance with one or more embodiments of the disclosure.

FIG. 3 shows a block diagram of a subsurface burrowing robot in accordance with one or more embodiments of the disclosure. Each of the one or more subsurface burrowing robots 130 comprises a mechanized head 302 at the frontal side, a body 304, a traction system 306, a rotational mechanism 308, a cable spool and unspooling mechanism 310 disposed at a rear side, and a robot controller 308. Each of these components is subsequently described.

The mechanized head 302 is connected to the vibration actuator 318 to provide a better penetration of the mechanized head 302 in the sand dunes. Each of the one or more subsurface burrowing robots 130 creates space in the loose or slightly compacted sand dunes with the special mechanized head 302. The special mechanized head 302 comprises a reciprocating mechanism, a dual rotary drill bit, two or more digging devices, and a granular fluidizing system, or any combination thereof.

The body 304 has a complex shape and comprises two or more segments configured to provide undulating movements to the body and turns in space (i.e., multiplicity degrees of freedom for free movement in space) to each of the one or more subsurface burrowing robots 130. Most of the body 304 may be cylindrical in shape to provide better passability in the tunnel created by digging the sand dunes. However, other components of the body (e.g., front, connecting, and back parts) may be of any shape depending on the purpose of the mission. The body 304 may be manufactured from various materials (e.g., plastic, carbon, composite, metal, flexible materials, or any combination thereof) with the purpose of protecting the internal systems of the one or more subsurface burrowing robots 130 (e.g., protection from dirt, dust, and water) and ensuring the movement of the one or more subsurface burrowing robots 130 underground without getting stuck and slipping. Various components may be installed in the body 304. For example, actuators 312, at least two batteries 314, and a vibration actuation 318 may be installed in the body 304.

The traction system 306 is located on the body 302. The traction system 306 is configured to provide forward and backward movements to the one or more subsurface burrowing robots 130. The traction mechanism 306 comprises two or more actuators, two or more tracks, an extraction-contraction propulsion system, and a soft robotics system, or any combination thereof. For example, while drilling into denser layers, the traction system 306 may be fixed in the tunnel as a spacer to create a support for efficient work of the mechanized head 302 which is equipped with the reciprocating mechanism, then the mechanized head 302 moves forward or backward using the traction system 306 and the undulating movements of the body 304.

The rotation mechanism 308 is disposed between two consecutive segments and it is powered by two or more actuators. The construction of the two or more segments and the rotation mechanism 308 provide the undulating movements to the body 302 and the turns in 3D of the one or more subsurface burrowing robots 130. For example, the rotation mechanism 308 may comprise a ball and socket joint system which provides a three degree of freedom joint system.

The cable spool and unspooling mechanism 310 is configured to unspool the unspooling cable while the one or more subsurface burrowing robots 130 is moving along the predefined path in the sand dunes.

The robot controller 316 is disposed in the body. The robot controller 316 is configured to control the autonomous operation and the navigation of the one or more subsurface burrowing robots 130. The components of the robot controller 316 are subsequently described by FIG. 4.

Figure 4:
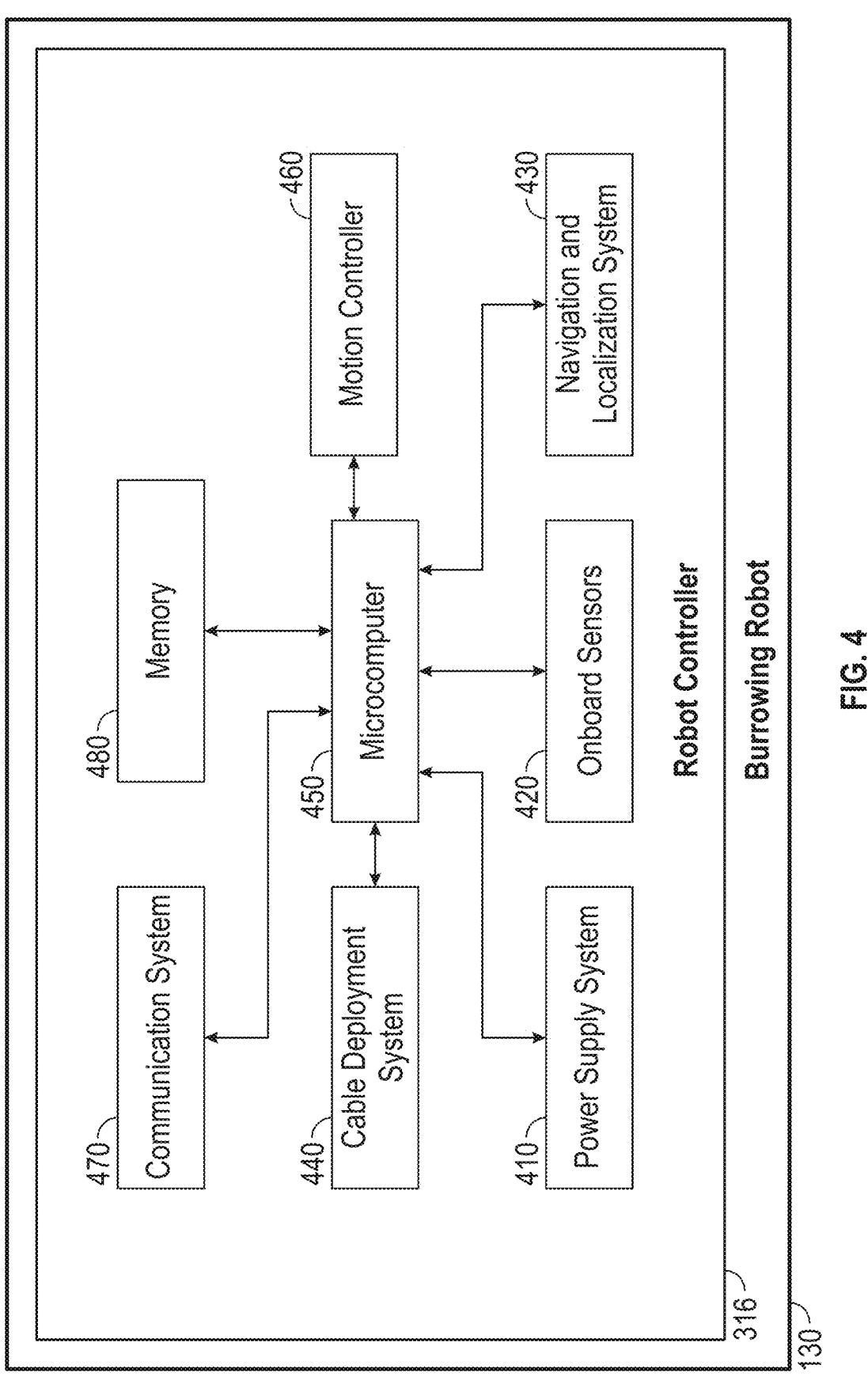
FIG. 4 shows a block diagram of a robot controller in accordance with one or more embodiments of the disclosure.

FIG. 4 shows a block diagram of a robot controller in accordance with one or more embodiments of the disclosure. The robot controller 316 comprises a power supply system 410, two or more onboard sensors 420, a navigation and localization system 430, a cable deployment system 440, a microcomputer 450, a motion controller 460, a communication system 470, and a memory 480. Each of these components is subsequently described.

The power supply system 410 is operatively connected to the microcomputer 450. The power supply system 410 comprises two or more batteries, two or more power converters, and two or more actuators. The power supply system 410 provides power to all systems of each of the one or more subsurface burrowing robots 130. The power supply system 410 is controlled by the microcomputer 450.

The two or more onboard sensors 420 are operatively connected to the microcomputer 450. The two or more onboard sensors 420 are configured to determine the orientations of the one or more subsurface burrowing robots 130. The two or more onboard sensors 420 comprise two or more inertial measurement unit (IMU) sensors, two or more accelerometers, two or more gyroscopes, and two or more compass sensors.

The navigation and localization system 430 is operatively connected to the microcomputer 450. The navigation and localization system 430 is configured to get the positions of the one or more subsurface burrowing robots 130 for localization in the subsurface and to geo-locate radio sources. For example, The navigation and localization system 430 may comprise a time difference of arrival (TDOA) system, a time of arrival (TOA) system, a magneto-inductive tracking system, and an inertial navigation system, or any combination thereof.

The cable deployment system 440 is operatively connected to the microcomputer 450. The cable deployment system 440 is configured to deploy the geophysical cables without a risk of entanglement with the one or more subsurface burrowing robots 130 or the obstacles in the sand dunes.

The microcomputer 450 is operatively connected to the power supply system 410, the two or more onboard sensors 420, the navigation and localization system 430, the cable deployment system 440, the motion controller 460, the communication system 470, and the memory 480. The microcomputer 450 is configured to control the autonomous operation and the navigation of the one or more subsurface burrowing robots 130.

The motion controller 460 is operatively connected to the microcomputer 460. The motion controller 460 is configured to manage the work of the two or more actuators of the traction system 306, the two or more actuators of rotational mechanism 308, and the vibration actuator 318 which is connected to the mechanized head 302. The motion controller 460 is configured to provide the movement of the one or more subsurface burrowing robots 130 in a given direction based on the data obtained from the navigation and localization system 430.

The communication system 470 is operatively connected to the microcomputer 450. The communication system 470 is configured to wirelessly exchange data with the surface station 110 and to wirelessly receive commands from the surface station 110.

The memory 480 is operatively connected to the microcomputer 450. The memory 480 is configured to store telemetry data.

Figure 5:
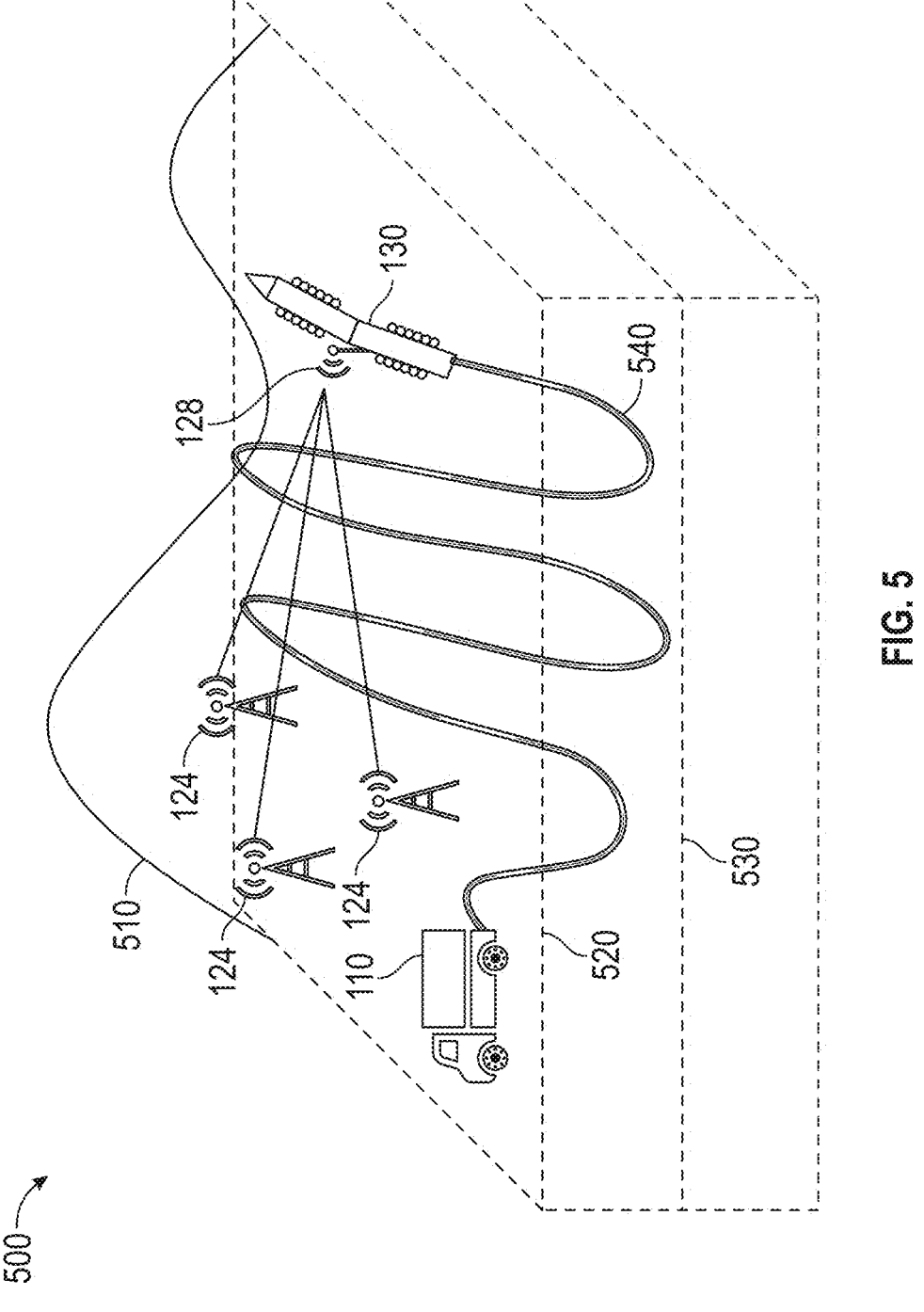
FIG. 5 shows an illustration of a process for autonomously deploying geophysical cables in the sand dunes area in accordance with one or more embodiments of the disclosure.

FIG. 5 shows an illustration of a process for autonomously deploying geophysical cables in the sand dunes area

500 in accordance with one or more embodiments of the disclosure. The one or more subsurface burrowing robots 130 comprises a distributed acoustic sensing (DAS) geophysical cables laying robot. For example, to facilitate the process of laying the geophysical cables, a smaller or bigger subsurface burrowing robot may be launched first to loosen the sand dunes 510 followed by the DAS geophysical cables laying robot.

The one or more subsurface burrowing robots 130 is configured to dig in the sand dunes 510 to a target depth located between a base of the sand dunes 520 and a base of the loose sand 530, to autonomously move under a surface of the loose sand along a predefined path, to exchange data with the surface station 110 via an unspooling cable 540, and to receive commands from the surface station 110 via the unspooling cable 540.

The GLRS 120 comprises a first GLRS 124 positioned on the base of the sand dunes 520 and a second GLRS 128 disposed on the one or more subsurface burrowing robots 130. The GLRS 120 is configured to transmit telemetry data, from the one or more subsurface burrowing robots 130 to the surface station 110.

Figure 6:
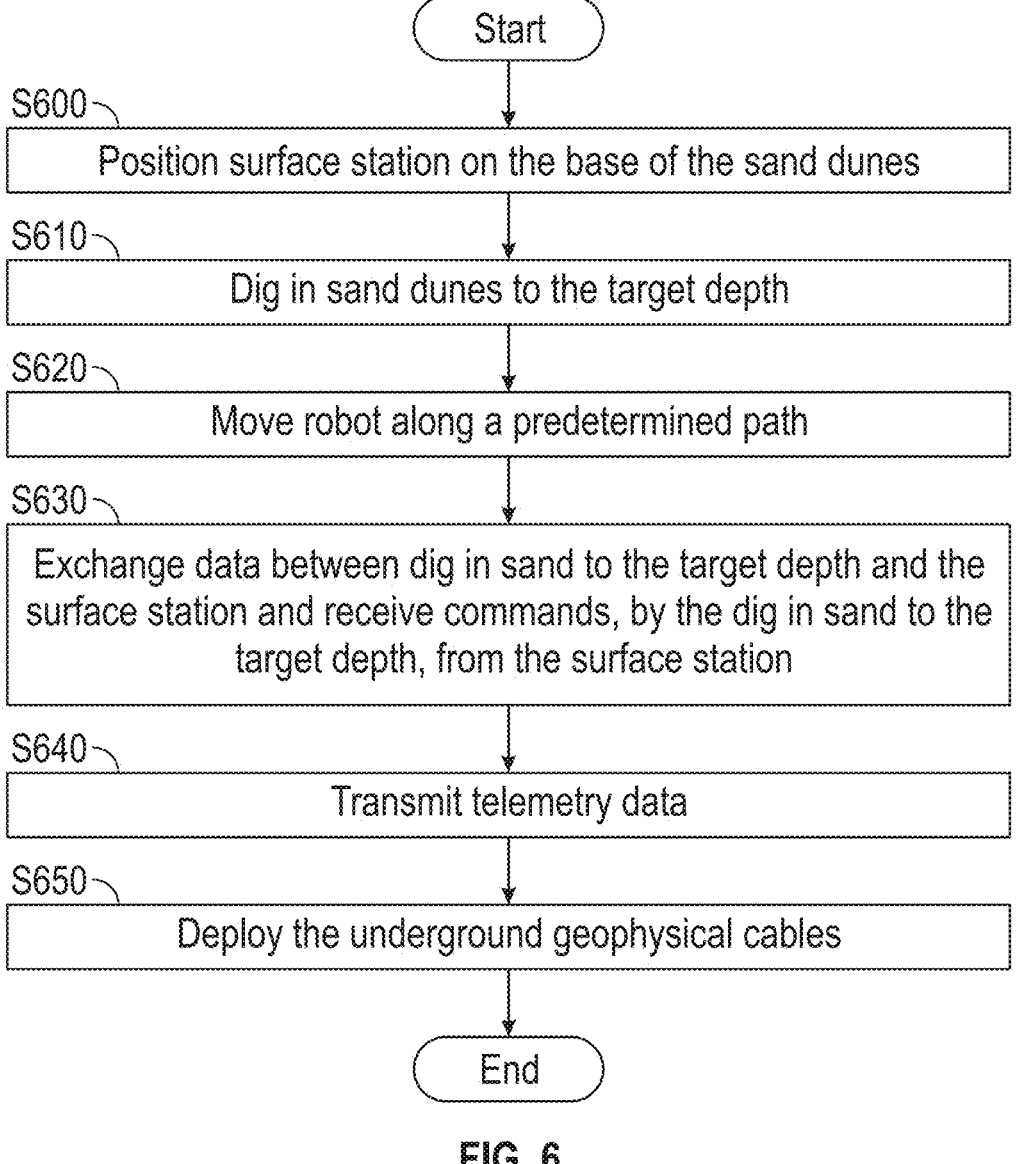
FIG. 6 shows a flowchart of a process for autonomously deploying geophysical cables in the sand dunes area in accordance with one or more embodiments of the disclosure.
Figures 7A, 7B:
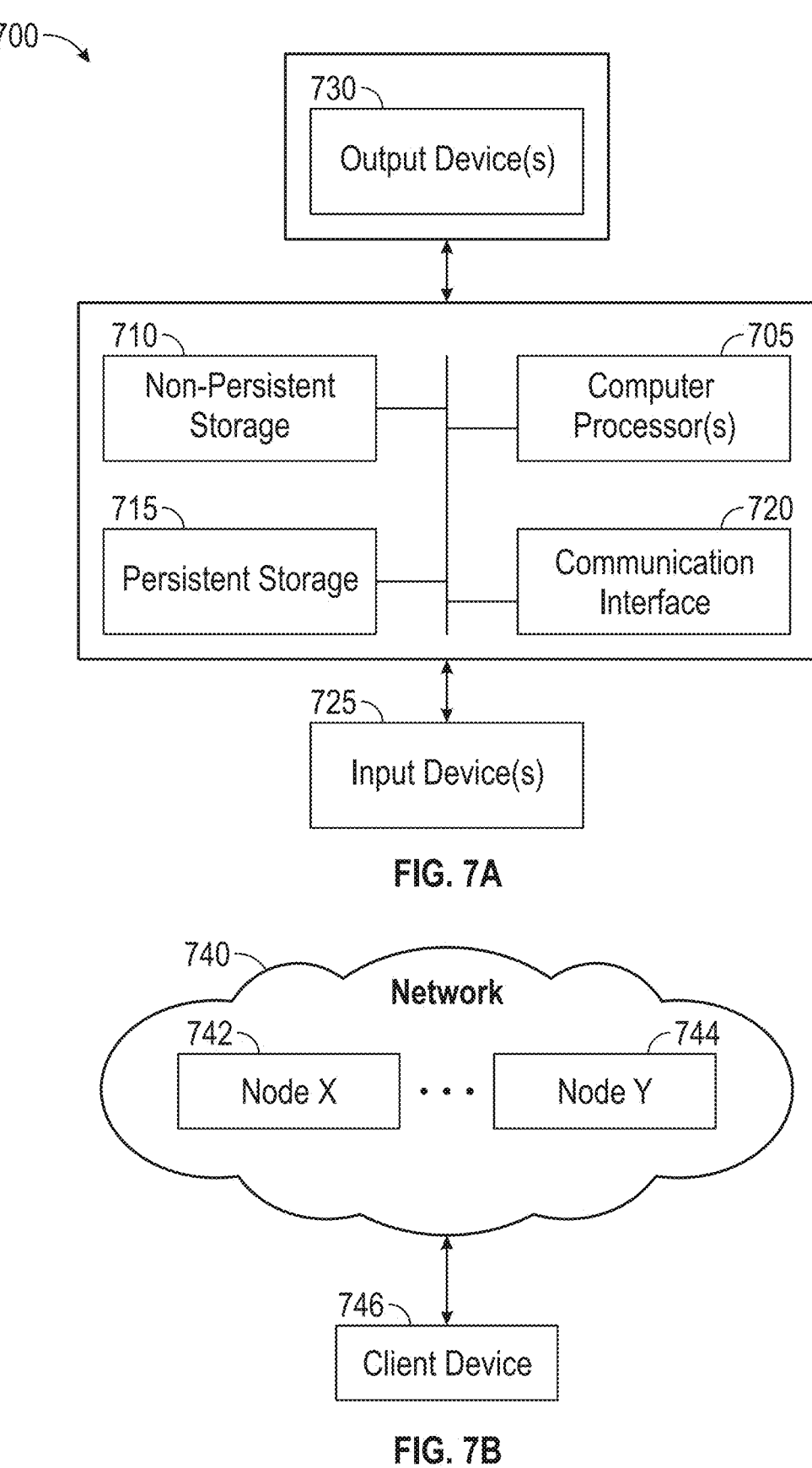
FIGS. 7A and 7B show a computing system in accordance with one or more embodiments of the disclosure.

FIG. 6 shows a flowchart of a process for autonomously deploying geophysical cables in the sand dunes area in accordance with one or more embodiments of the disclosure. The process for autonomously deploying geophysical cables in the sand dunes area may be performed on a computer system, as shown in FIG. 7A.

In step S600, the surface station 110 is positioned at the sand dunes 510. The operator 290 of the surface station 110 sets the parameters of the mission for deploying the geophysical cables using the GUI 270. The mission planner 280 prepares the tasks and the movement trajectory for deploying the geophysical cables based on the ground map and the terrain data stored in the database 250.

In step S610, the one or more subsurface burrowing robots 130 dig in the sand dunes 510 to a target depth located between the base of the sand dunes 520 and the base of the loose sand 530.

In step S620, the one or more subsurface burrowing robots 130 autonomously moves under the surface of the loose sand along a predefined path. The operator 290 of the surface station 110, using the ground map displayed on the GUI 270, oversees the mission as it unfolds and visualizes real-time positions of the one or more subsurface burrowing robots 130.

In step S630, the one or more subsurface burrowing robots 130 exchange data with the surface station 110 via the unspooling cable 540 and receive commands from the surface station 110 via the unspooling cable 540. The exchange of data and the reception of commands occur between the digging in the sand dunes to the target depth and while moving along the predetermined path.

In step S640, telemetry data are transmitted by the one or more subsurface burrowing robots 130 to the surface station 110 via the GLRS 120 GLRS 120 comprising the first GLRS 124 positioned on the base of the sand dunes 520 and the second GLRS 128 disposed on the one or more subsurface burrowing robots 130. The operator 290 of the surface station 110 makes corrections to the movement trajectory of the one or more subsurface burrowing robots 130.

In step S645, the underground geophysical cables are deployed. The operator 290 of the surface station 110, using the ground map displayed on the GUI 270, checks the positions of deployed the geophysical cables. The data of the mission, the geophysical cables, and the telemetry data are stored in the data storage.

FIGS. 7A and 7B show a computing system in accordance with one or more embodiments of the disclosure. The process for autonomously deploying geophysical cables in the sand dunes area may be performed on a computing system, as shown in FIGS. 7A and 7B. Any combination of mobile, desktop, server, router, switch, embedded device, or other types of hardware may be used. For example, the computing system 700 may include one or more computer processor(s) 705, a non-persistent storage 710 (e.g., volatile memory, such as random access memory (RAM), cache memory), a persistent storage 715 (e.g., a hard disk, an optical drive such as a compact disk (CD) drive or digital versatile disk (DVD) drive, a flash memory, etc.), a communication interface 720 (e.g., Bluetooth interface, infrared interface, network interface, optical interface, etc.), and numerous other elements and functionalities.

The computer processor(s) 705 may be an integrated circuit for processing instructions. For example, the computer processor(s) 705 may be one or more cores or micro-cores of a processor. The computing system 700 may also include one or more input device(s) 725, such as a touchscreen, keyboard, mouse, microphone, touchpad, electronic pen, or any other type of input device.

The communication interface 720 may include an integrated circuit for connecting the computing system 700 to a network (not shown) (e.g., a local area network (LAN), a wide area network (WAN) such as the Internet, mobile network, or any other type of network) and/or to another device, such as another computing device.

The computing system 700 may further includes one or more output device(s) 730, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input device(s) 725 and the output device(s) 730 may be locally or remotely connected to the computer processor(s) 705, the non-persistent storage 710, and the persistent storage 715. Many different types of computing systems exist, and the aforementioned input device(s) 725 and output device(s) 730 may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system 700 in FIG. 7A may be connected to or be a part of a network. For example, as shown in FIG. 7B, the network 740 may include multiple nodes (e.g., node X 742, node Y 744). Each node may correspond to a computing system, such as the computing system shown in FIG. 7A, or a group of nodes combined may correspond to the computing system shown in FIG. 7A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 700 may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 742, node Y 744) in the network 740 may be configured to provide services for a client device 746. For example, the nodes may be part of a cloud computing system. The nodes may include functionality to receive requests from the client device 746 and transmit responses to the client device 746. The client device 746 may be a computing system, such as the computing system shown in FIG. 7A. Further, the client device 746 may include and/or perform all or a portion of one or more embodiments of the disclosure.

The computing system or group of computing systems described in FIGS. 7A and 7B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may be executed on the same or different computing system.

Rather than or in addition to sharing data between processes, the computing system 700 performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor(s) 705. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system 700, in performing one or more embodiments of the disclosure, may extract one or more data items from the obtained data.

For example, the extraction may be performed as follows by the computing system 700 in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system 700 of FIG. 7A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database management system (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system 700 of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system 700 of FIG. 7A and the nodes and/or client device 746 in FIG. 7B. Other functions may be performed using one or more embodiments of the disclosure.

Embodiments of the present disclosure may provide at least one of the following advantages. Embodiments of the disclosure may provide a partial automation for geophysical data acquisition in sand dunes or coastal silt areas, reduce the operational cost of geophysical data acquisition in sand dunes or coastal silt areas, improve safety and reduce the required labor exposure related to the geophysical data acquisition in sand dunes or coastal silt areas, and applications in the field of land data acquisition and processing.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A system for autonomously deploying geophysical cables in sand dunes, the system comprising:
   a surface station positioned at the sand dunes;
   a subsurface burrowing robot comprising a distributed acoustic sensing (DAS) geophysical cables laying robot and configured to:
      dig in the sand dunes to a target depth located between a base of the sand dunes and a base of loose sand,
      autonomously move under a surface of the loose sand along a predefined path,
      exchange data with the surface station via an unspooling cable, and
      receive commands from the surface station via the unspooling cable; and
   a geo-locating radio system (GLRS) configured to transmit telemetry data, from the subsurface burrowing robot to the surface station, wherein the GLRS comprises:
      a first GLRS positioned on the base of the sand dunes, and
      a second GLRS disposed on the subsurface burrowing robot,
   wherein the subsurface burrowing robot further comprises:
   a body, wherein the body comprises a plurality of segments configured to provide undulating movements to the body and turns in space to the subsurface burrowing robot;
   a rotational mechanism disposed between two consecutive segments and powered by a plurality of actuators; and
   a mechanized head at a frontal side connected to a vibration actuator, wherein the mechanized head comprises:
      a reciprocating mechanism,
      a dual rotary drill bit,
      a plurality of digging devices, and
      a granular fluidizing system.

2. The system according to claim 1, wherein the surface station comprises:
   a surface station controller, comprising:
      a database configured to store a ground map and terrain data of the sand dunes;
      a mission planner operatively connected to the database, wherein the mission planner prepares a movement trajectory for deploying the geophysical cables based on the ground map and the terrain data; and
      a graphical user interface (GUI) operatively connected to the mission planner and configured to receive, from an operator of the surface station, setting parameters of a mission for deploying the geophysical cables.

3. The system according to claim 2, wherein the surface station further comprises:

a mission manager operatively connected to the GUI and the mission planner, wherein the mission manager is configured to allow the operator to:

oversee the mission as the mission manager unfolds by using the ground map displayed on the GUI, visualize real-time positions of the subsurface burrowing robot, make corrections to the movement trajectory, and check positions of the geophysical cables.

4. The system according to claim 3, wherein the surface station further comprises:

a communication system operatively connected to the mission manager and configured to provide the movement trajectory to the subsurface burrowing robot, a cable deployment system operatively connected to the communication system and the mission manager;

a navigation and localization system operatively connected to the mission manager and the database; and a data storage operatively connected to the mission manager, wherein the data storage is configured to store:

data of the mission, data of the positions of the geophysical cables, and the telemetry data.

5. The system according to claim 1, wherein the subsurface burrowing robot further comprises:

a traction system located on the body and configured to provide forward and backward movements to the subsurface burrowing robot, wherein the traction system comprises:

a plurality of actuators, a plurality of tracks, an extraction-contraction propulsion system, and a soft robotics system;

a cable spool and unspooling mechanism disposed at a rear side of the subsurface burrowing robot and configured to unspool the unspooling cable while the subsurface burrowing robot is moving along the pre-defined path; and a robot controller disposed in the body and configured to control autonomous operation and navigation of the subsurface burrowing robot.

6. The system according to claim 5, wherein the robot controller comprises:

a microcomputer configured to control autonomous operation and navigation of the subsurface burrowing robot; and a plurality of onboard sensors operatively connected to the microcomputer and configured to determine orientations of the subsurface burrowing robot, wherein the plurality of onboard sensors comprise:

a plurality of inertial measurement unit (IMU) sensors, a plurality of accelerometers, a plurality of gyroscopes, and a plurality of compass sensors.

7. The system according to claim 6, wherein the robot controller further comprises:

a power supply system operatively connected to the microcomputer, wherein the power supply system comprises:

a plurality of batteries, a plurality of power converters, and a plurality of actuators; and a cable deployment system operatively connected to the microcomputer.

8. The system according to claim 7, wherein the robot controller further comprises:

a navigation and localization system operatively connected to the microcomputer and configured to get positions of the subsurface burrowing robot and to geo-locate radio sources, wherein the navigation and localization system comprises:

a time difference of arrival (TDOA) system, a time of arrival (TOA) system, a magneto-inductive tracking system, and an inertial navigation system;

a communication system operatively connected to the microcomputer, wherein the communication system is configured to:

wirelessly exchange data with the surface station, and wirelessly receive commands from the surface station.

9. The system according to claim 8, wherein the robot controller further comprises:

a motion controller operatively connected to the microcomputer, wherein the motion controller is configured to:

manage work of:

the plurality of actuators of the traction system, the plurality of actuators of rotational mechanism, and the vibration actuator connected to the mechanized head; and provide movement of the subsurface burrowing robot in a direction based on positions of the subsurface burrowing robot from the navigation and localization system; and a memory operatively connected to the microcomputer and configured to store the telemetry data.

10. A method for autonomously deploying geophysical cables in sand dunes, the method comprising:

positioning a surface station at the sand dunes;

digging in the sand dunes, using subsurface burrowing robot including a distributed acoustic sensing (DAS) geophysical cables laying robot, to a target depth located between a base of the sand dunes and a base of loose sand;

autonomously moving the subsurface burrowing robot under a surface of the loose sand along a predefined path;

exchanging data between the subsurface burrowing robot and the surface station via an unspooling cable;

receiving commands, by the subsurface burrowing robot, from the surface station via the unspooling cable; and transmitting telemetry data, by a geo-locating radio system (GLRS) from the subsurface burrowing robot to the surface station, wherein the GLRS comprises:

a first GLRS positioned on the base of the sand dunes, and a second GLRS disposed on the subsurface burrowing robot, wherein the subsurface burrowing robot further comprises a body, a rotational mechanism, a mechanized head at a frontal side connected to a vibration actuator, a traction mechanism located on the body, a cable spool and unspooling mechanism disposed at a rear side, a robot controller, a navigation and localization system, and a memory, the method further comprises:

providing undulating movements to the body and turns in space to the subsurface burrowing robot; and connecting the vibration actuator to the mechanized head, wherein the mechanized head comprises:

a reciprocating mechanism, a dual rotary drill bit, a plurality of digging devices, and a granular fluidizing system.

11. The method according to claim 10, wherein the surface station comprises a surface station controller including a database, a mission planner, a graphical user interface (GUI), a mission manager, a communication system, a cable deployment system, a navigation and localization system, and a data storage, the method further comprises:

storing, in the database, a ground map and terrain data of the sand dunes;

preparing, using mission planner, a movement trajectory for deploying the geophysical cables based on the ground map and the terrain data; and inputting on the GUI, by an operator of the surface station, a setting position of the geophysical cables of a mission for deploying the geophysical cables.

12. The method according to claim 11, the method further comprises:

overseeing the mission, by the operator using the mission manager, as the mission manager unfolds by using the ground map displayed on the GUI;

visualizing, by the operator using the mission manager, real-time positions of the subsurface burrowing robot;

making corrections, by the operator using the mission manager, to the movement trajectory; and checking, by the operator using the mission manager, the positions of the geophysical cables.

13. The method according to claim 12, wherein the method further comprises:

providing the movement trajectory, using the communication system, to the subsurface burrowing robot; and storing in the data storage:

data of the mission, data of the setting position of the geophysical cables, and the telemetry data.

14. The method according to claim 10, wherein the method further comprises:

providing forward and backward movements, by the traction mechanism, to the subsurface burrowing robot, wherein the traction mechanism comprises:

a plurality of actuators, a plurality of tracks, an extraction-contraction propulsion system, and a soft robotics system;

unspooling the unspooled cable, by cable spool and unspooling mechanism, while the subsurface burrowing robot is moving along the predefined path; and controlling, by the robot controller, autonomous operation and navigation of the subsurface burrowing robot.

15. The method according to claim 14, wherein the robot controller comprises a microcomputer, a plurality of sensors, a power supply system, a cable deployment system, a navigation and localization system, a communication system, a motion controller, and a memory, the method further comprises:

controlling, by the microcomputer, autonomous operation and navigation of the subsurface burrowing robot; and determining, by the plurality of onboard sensors, orientations of the subsurface burrowing robot, wherein the plurality of onboard sensors comprise comprises:

a plurality of inertial measurement unit (IMU) sensors, a plurality of accelerometers, a plurality of gyroscopes, and a plurality of compass sensors.

16. The method according to claim 15, wherein the method further comprises:

supplying power, by the power supply system, to the subsurface burrowing robot, wherein the power supply system comprises:

a plurality of batteries, a plurality of power converters, and a plurality of actuators.

17. The method according to claim 16, wherein the method further comprises:

getting positions of the subsurface burrowing robot and to geo-locating radio sources, by the navigation and localization system, wherein the navigation and localization system comprises:

a time difference of arrival (TDOA) system, a time of arrival (TOA) system, a magneto-inductive tracking system, and an inertial navigation system;

wirelessly exchanging data, by the communication system, with the surface station; and wirelessly receiving commands, by the communication system, from the surface station.

18. The method according to claim 14, wherein the method further comprises:

managing work of:

the plurality of actuators of the traction mechanism, the plurality of actuators of rotational mechanism, and the vibration actuator connected to the mechanized head; and providing movement of the subsurface burrowing robot in a direction based on positions of the subsurface burrowing robot from the navigation and localization system; and storing the telemetry data by the memory.

* * * * *